United States Patent [19]

Ohno et al.

[11] Patent Number: 4,636,427
[45] Date of Patent: Jan. 13, 1987

[54] ADHESIVE TAPE AND PROCESS FOR PREPARATION THEREOF

[75] Inventors: Shoji Ohno; Sigeru Sugada, both of Uozu, Japan

[73] Assignee: Toyama Industry Co., Ltd., Tokyo, Japan

[21] Appl. No.: 726,415

[22] Filed: Apr. 24, 1985

[30] Foreign Application Priority Data

Nov. 13, 1984 [JP] Japan ................................ 59-239273

[51] Int. Cl.⁴ ................................................ B32B 7/00
[52] U.S. Cl. .................................... 428/246; 428/252;
428/257; 428/284; 428/286; 428/297; 428/343;
428/354
[58] Field of Search ............... 428/246, 252, 257, 258,
428/343, 354, 297, 284, 286

[56] References Cited

U.S. PATENT DOCUMENTS 4,304,813 12/1981 Elmore ................................. 428/354
4,349,599 9/1982 Adams ................................. 428/354
4,503,114 3/1985 Cohen ................................. 428/354
4,591,529 5/1986 Behringer et al. ................... 428/354

FOREIGN PATENT DOCUMENTS 1040835 9/1966 United Kingdom ................ 428/354

Primary Examiner—James J. Bell
Attorney, Agent, or Firm—Harry M. Weiss

[57] ABSTRACT

This invention provides an adhesive tape which can easily be cut in the lateral direction by hand, and a process for preparation thereof. The adhesive tape comprises (1) a fabric base in which the warp and filling are made of thermoplastic yarns, the denier of the warp yarns is lower than that of the filling yarns and the number of warp yarns per inch is larger than the number of filling yarns per inch; (2) a first thermoplastic layer which is laminated on the surface of said fabric base; (3) a second thermoplastic layer which is laminated on at least one of the surfaces (1) and (2); and a pressure-sensitive adhesive which is applied to at least one of the surfaces of (1), (2) and (3).

11 Claims, 4 Drawing Figures

ADHESIVE TAPE AND PROCESS FOR PREPARATION THEREOF

BACKGROUND OF THE INVENTION

1. Field of the Invention

This invention relates to a pressure-sensitive adhesive tape comprising a fabric base made of thermoplastic yarn, characterized in that the tape can easily be cut by hand in the direction normal to the longer direction i.e., in the lateral direction, and used for binding packages and masking. This invention also relates to processes for preparing such a tape.

2. Description of the Prior Art

An adhesive tape like that described above has been disclosed in Japanese Utility Model Publication No. 30362/1975. This tape comprises a fabric base made of flat thermoplastic yarns, preferably polyalkylene yarns; and one surface of the fabric base is laminated with a film of the same thermoplastic as that of the flat yarns; and the other surface of the fabric base is bonded with pressure-sensitive adhesive. Furthermore, the fabric base is formed so that the lateral tear strength is lower than the longitudinal tear strength. As methods for decreasing the lateral tear strength of the fabric base, the publication discloses a method in which a plastic having a low thermal softening point and low crystallizability is blended in the warp and the warp is deteriorated by heat treatment in the laminating step, a method in which the draw ratio of the warp is made smaller than that of the filling, a method in which number of warp yarns per inch is made fewer than number of filling yarns per inch and a method in which the denier of the warp yarns is made smaller than that of the filling yarns. However, when the lateral tear strength of the tape is lowered by one of said methods so that the tape can be cut by hand, the longitudinal tear strength of the tape simultaneously decreases and therefore, the tape is not usable for applications in which it is required to have greater than a given strength level, as when used for binding packages.

SUMMARY OF THE INVENTION

It is therefore a primary object of the present invention is to provide an adhesive tape in which the lateral tear strength is so low that the tape can easily be cut by hand without using scissors or a cutter and the longitudinal tear strength of the tape is sifficiently high for the tape to be used in a very wide range of applications.

Another object of this invention is to provide an adhesive tape which may be prepared with a small amount of adhesive.

Another object of this invention is to provide a simple process for preparing said adhesive tape that can be easily applied industrially.

These and other objects of this invention will be clear from the following description.

In accrodance with the present invention, there is provided an adhesive tape comprising (1) a fabric base in which the warp and filling are made of thermoplastic yarns, the denier of the warp yarns being lower than that of the filling yarns and the number of warp yarns per inch being made larger than the number of filling yarns per inch; (2) a first thermoplastic layer which is laminated on the surface of said fabric base in such manner that the thermoplastic is embedded in the spaces of said fabric base to fix the yarns thereof with the thermoplastic by welding; (3) a second thermoplastic layer which is laminated on at least one surface of (1) and (2); and (3) a pressure-sensitive adhesive which is applied to at least one of the surfaces of (1), (2) and (3). The invention also provides a process for preparing such an adhesive tape.

DESCRIPTION OF THE PREFERRED EMBODIMENTS

Fabric Base

Figure 1:
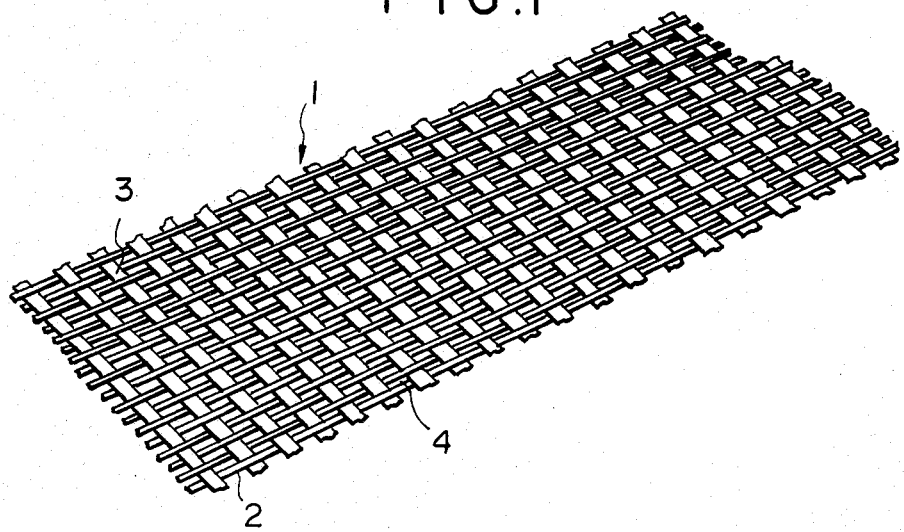
FIG. 1 is a perspective view of a fabric base.

Referring to FIG. 1 wherein a woven cloth 1, having warp yarns 2, filling yarns 3 and spaces 4, is illustrated as an example of the fabric base used in the present invention, the woven cloth 1 is made of thermoplastic yarns, preferably polyolefin yarns such as:

high density polyethylene (HD-PE) having a melt flow rate (MFR) of 0.01 to 6 and a density of 0.940 to 0.970 g/cm$^3$, low density polyethylene (LD-PE) having an MFR of 0.1 to 2 and a density of 0.910 to 0.930 g/cm$^3$, linear low density polyethylene (LLD-PE) having an MFR of 0.5 and 50 and a density of 0.910 to 0.940 g/cm$^3$, or polypropylene (PP) having an MFR of 0.5 to 15 and a density of 0.850 to 0.910 g/cm$^3$.

It is preferable for the yarns to be made of a blend of 90 to 60% by weight of HD-PE and 10 to 40% by weight of LLD-PE. For the purpose of maintaining the longitudinal tear strength of the tape high while making it possible to easily cut the tape in the lateral direction by hand, one of the following conditions is met in making the fabric base:

(i) the fineness of the warp yarns 2 is selected to be 80 to 250 denier, preferably of 120 to 200 denier, finer than that of the filling yarns 3; or (ii) the number of warp yarns 2 per inch is made 15 to 40, preferably from 20 to 35, greater than the number of filling yarns 3 per inch.

The warp yarns 2 used are usually 50 to 250 denier fibers, preferably 75 to 150 denier fibers, and the filling yarns 3 used are usually 200 to 400 denier fibers. The number of warp yarns 2 per inch is from 30 to 60 and the number of filling yarns 2 per inch is from 12 to 25. The yarns of both the warp 2 and the filling 3 may be round or of any of various other sectional shapes, but it is preferable that flat yarn be used. The thickness of the fabric base used in the present invention is not particularly limited but is generally from 10 to 25$\mu$, preferably from 15 to 20$\mu$.

Laminated Layer

In the present invention, both a first 5 and second 6 laminated layers are made of thermoplastic, preferably a polyolefin such as HD-PE, LD-PE, LLD-PE or PP. LLD-PE is preferable. The first 5 and second 6 layers are laminated on the fabric base 1 in the manner shown in FIG. 3 and FIG. 4. A part of the first layer 5 is embedded in the spaces 4 and warp 2 and filling 3 are firmly welded together thereby. The thermoplastic of the first 5 and second 6 layers may be of the same or different kinds.

Pressure-Sensitive Adhesive

Natural rubber adhesive, synthetic rubber adhesive such as polyisobutylene, SBR or butyl rubber, acrylic rubber and vinyl rubber such as polyvinylether or polyvinylbutyral can be used in the present invention. It is preferable to use acrylic adhesive. The pressure-sensitive adhesive 7 is applied to a non-laminated surface of the fabric base 1 (FIG. 3) or on at least one selected from the first 5 and second 6 laminated surfaces. The thickness of the adhesive 7 is from 20 to 40μ, preferably from 25 to 35μ.

Process for Preparing an Adhesive Tape

Figure 2:
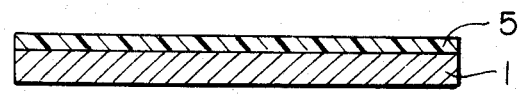
FIG. 2 is an enlarged sectional view of a structure in which first thermoplastic layer is laminated on the fabric base.

The fabric base is activated for the purpose of increasing the adhesion strength between the fabric base 1 and first laminate layer 5. The activation can be carried out at the start of the process or at a later stage. The activation can be conducted by a corona discharge treatment, flame treatment or other treatment. After the activation, the first laminate layer 5 is formed by laminating a thermoplastic film on the surface of the fabric base 1. (See FIG. 2.) So as to deteriorate the yarn of the fabric base 1, the lamination of this film is carried out by extrusion at a temperature of 300° to 310° C. under a pressure of 3.0 to 3.5 kg/cm$^2$ to form a layer with a thickness between 40 to 60μ. That is, the temperature of lamination is kept somewhat low and the laminate layer 5 is made somewhat thick so that the total amount of heat retained becomes larger, whereby the yarn is positively deteriorated. On the other hand, the flowability of the laminate layer 5 is restrained so that the thermoplastic laminate becomes embedded in the spaces 4 of the fabric base 1 only to a moderate degree.

Figure 3:
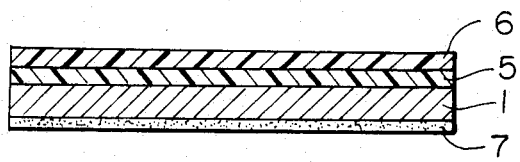
FIGS. 3 and 4 are enlarged sectional views of an adhesive tape of the present invention.

In the next step, the second laminate layer 6 is formed on the surface of the first laminate layer 5. In order to firmly weld the first layer 5 and the yarns of the fabric base 1, the second lamination is carried out at a temperature of 310° to 320° C. under a pressure of 4.0 to 4.5 kg/cm$^2$ to form a layer with a thickness between 10 and 30μ. In this lamination, the temperature of the second laminate layer 6 is kept relatively high, the thickness thereof is made relatively thin and the first laminate layer 5 is made softer again. As a result, the first laminate layer 5 is further embedded in the spaces 4 of the fabric base 1 to more strongly weld the first layer 5 and the yarn of the fabric base 1. Accordingly, the tensile strength longitudinal of the fabric base 1 is maintained or increased and the lateral tear strength is greatly decreased. Referring to FIG. 3, the adhesive tape of the present invention is obtained by applying a pressure-sensitive adhesive 7 to a non-laminated surface of the structure after the second layer 6 has been laminated.

The adhesive tape of the present invention may be prepared by other processes. For example, in laminating a thermoplastic film on the surface of an activated fabric base to obtain the tape shown in FIG. 2, the lamination can be carried out at a temperature of 310° to 320° C. under a pressure of 4.0 to 4.5 kg/cm$^2$ to form a layer with a thickness of from 20 to 40μ. In this lamination, the temperature of the first lminate layer 5 is kept relatively high and the thickness thereof is made relatively thin, thereby the flowability of the first layer 5 is increased but the total amount of heat retained becomes smaller. Therefore, the deterioration of the yarn of the fabric base 1 is restrained. On the other hand, the first laminate layer 5 can be embedded in the spaces 4 of the fabric base 1 by raising the pressure of the pressure roll about 1 kg/cm$^2$ higher than usual. When this method is used, the range of movement of the warp yarns 2 and filling yarns 3 becomes smaller and each of the yarns of the fabric base 1 is firmly fixed to first layer 5 by welding. Therefore, the second thermoplastic layer 6 is laminated on the opposite surface of the fabric base 1 by extrusion at a temperature of 300° to 350° C. under a pressure of 3.0 to 3.5 kg/cm$^2$ to form a second layer 6 with a thickness of from 30 to 50μ. By this extrusion-lamination, the yarns of the fabric base 1 are deteriorated, but at the same time, the longitudinal tensile strength is maintained or increased by the total thickness of the first 5 and second 6 layers both of which are welded to the fabric base 1 and therefore, the adhesive tape has a longitudinal tensile strength sufficient for practical use. Furthermore, since a part of the laminate is embedded in the spaces 4 of the fabric base 1 and since the laminate firmly welds the warp 2 and filling 3 yarns of the fabric base 1, the warp yarns 2 will not be moved in the tear direction by the tear force when the tape is torn. Accordingly the tape can easily be cut by hand because the total tearing force is directed to the warp.

Figure 4:
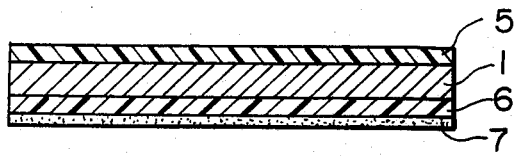

After forming the second layer 6 as described above, a pressure-sensitive adhesive 7 is applied to one or both of the first 5 and second 6 laminate layers to obtain the adhesive tape shown in FIG. 4. As a pressure-sensitive adhesive layer 7 is applied to the outer surface of the laminate layer(s) 5, 6, the adhesive 7 does not become embedded in the fabric base 1. It is therefore economical because it can be produced using less adhesive 7.

As described above, the adhesive tape of the present invention is characterized in that it uses a specific fabric base having a special structure and that the process for its production involves two laminating treatments, whereby the longiduinal tensile strength of the tape can be strengthened and the lateral tear strength can be weakened. This is advantageous in that it gives the adhesive tape of the present invention a very wide range of applications. Further, a pigment or an inorganic filler can be incorporated in the warp, the filling or the laminate layers. On the other hand, if the tape of the present invention is prepared without using a pigment or inorganic filler, the tape is transparent, which is advantageous when the tape is used on a surface printed with characters since the characters can be read through the tape.

EXAMPLES

The present invention now will be further illustrated by, but is by no means is limited to, the following examples, in which all percentages are expressed on a weight basis unless otherwise specified.

EXAMPLE 1

Referring to FIG. 1, a plain cloth 16.3μ in thickness was used as the fabric base. This cloth comprised 75% of HD-PE (density: 0.950 g/cm$^3$; MFR: 0.8) and 25% of LLD-PE (density: 0.928 g/cm$^3$; MRF: 2.0) and consisted of warp and filling yarns as shown below:

|  | Denier | Number of yarns per inch |
|---|---|---|
| Warp | 115 | 46 |
| Filling | 300 | 16 |

The adhesive tape of the present invention was prepared according to the following process:

First laminating step

One surface of the fabric base was activated by corona discharge and then a film of LD-PE heated to a temperature of 300° to 310° C. was extrusion-laminated on the activated surface of the fabric base under a pressure of 3 to 3.5 kg/cm² to form a 50μ thick laminate layer. The LD-PE had a density of 0.920 g/cm³, MFI of 8.0, softing temperature of 85° to 95° C. and end melting point of 108° to 112° C.

Second laminating step

After the first laminate structure had cooled, its outer surface was activated by corona discharge and LD-PE heated to a temperature of 310° to 320° C. was extrusion-laminated on the activated surface of the first laminate layer under a pressure of 4 to 4.5 kg/cm² to form a 30μ thick second laminate layer. The LD-PE was the same as that of the first laminate layer.

Adhesive application step

The non-laminated surface of the fabric base was activated by corona discharge after the second laminated structure had cooled, and a pressure-sensitive acrylic adhesive was applied to the activated surface to form an adhesive layer having an average thickness of 30μ. Thus, an adhesive tape as shown in FIG. 3 was obtained. The tape was tested. The results obtained are shown in Table I.

EXAMPLE 2

The adhesive tape of the present invention shown in FIG. 4 was prepared by the following process using the same fabric base, thermoplastic and adhesive as in Example 1.

First laminating step

One surface of the fabric base was activated by corona discharge and a film of LD-PE heated to a temperature of 310° to 320° C. was extrustion-laminated on the activated surface of the fabric base under a pressure of 4 to 4.5 kg/cm² to form 30μ thick laminate layer.

Second laminating step

The opposite surface of the fabric base was activated by corona discharge after the first laminate had cooled and LD-PE heated to a temperature of 300° to 305° C. was laminated on the activated surface under a pressure of 3 to 3.5 kg/cm² to form a second 40μ thick laminate layer.

Adhesive application step

After the second laminated structure had cooled, its outer surface was activated by corona discharge and a pressure-sensitive adhesive was applied to the activated surface to form an adhesive layer having an average thickness of 30μ. Thus, the adhesive tape of the present invention was obtained.

The tape was tested. The results obtained are shown in Table I.

TABLE 1

|  | Example 1 | Example 2 |
|---|---|---|
| Lateral tear strength (kg) | | |
| after the first laminating step | 1.90 | 2.25 |
| after the second laminating step | 1.60 | 1.45 |
| end-product | 1.52 | 1.36 |
| Longitudinal tear strength of end product (kg) | 28.2 | 29.1 |
| Tensile strength (kg/5 cm) | | |
| warp direction | 39.4 | 38.4 |
| filling direction | 54.9 | 52.4 |
| Tensile elongation (%) | | |
| warp direction | 10.0 | 10.2 |
| filling direction | 10.0 | 10.0 |

The tests were conducted by the following methods:
Tear strength . . .
JIS L-1079, L-1096
ASTM D-2262-71
Tensile strength and elongation . . .
JIS 1068
ASTM D-1632-64

As is clear from the results shown in Table 1, the lateral tear strength of the structure after the first lamination step is still high, but that after the second lamination step is considerably lower. This reduction of the lateral tear strength can be realized in spite of the increased thickness of the structure because the warp is deteriorated and the yarns are firmly welded by the second lamination. However, the tape could not be easily torn in the longitudinal direction since the longitudinal tear strength of the tape is 3 times to 4 times higher than the filling tear strength. Therefore, it was ascertained that warp tear strength of the tape may be sufficiently strengthened.

While the invention has been particularly shown and described in reference to preferred embodiments thereof, it will be understood by those skilled in the art that the changes in form and details may be made therein without departing from the spirit and scope of the invention.

What is claimed is:

1. An adhesive tape comprising (1) a fabric base in which the warp and filling are made of thermoplastic yarns, the denier of the warp yarns being lower than that of the filling yarns and the number of warp yarns per inch being larger than the number of filling yarns per inch; (2) a first thermoplastic layer which is laminated on the surface of said fabric base in such manner that the thermoplastic is embedded in the spaces of said fabric base to firmly weld the yarns of said fabric base with the thermoplastic; (3) a second thermoplastic layer which is laminated on at least one of the surfaces of (1) and (2); and a pressure-sensitive adhesive which is applied to at least one of the surfaces of said structure of (1), (2) and (3).

2. An adhesive tape as set forth in claim 1 wherein the warp yarns of the fabric base have a denier of from 50 to 250, the filling yarns of the fabric base have a denier of from 200 to 400 and the denier of the warp yarns is from 120 to 200 finer than that of the filling yarns.

3. An adhesive tape as set forth in claim 1 wherein number of warp yarns per inch in the fabric base is from 30 to 40, the number of filling yarns per inch in the fabric base is from 12 to 25 and number of warp yarns per inch is from 20 to 35 greater than the number of filling yarns per inch.

4. An adhesive tape as set forth in claim 1 wherein both the warp yarns and the filling yarns in the fabric base are formed of polyolefin.

5. An adhesive tape as set forth in claim 4 wherein the polyolefin yarns are made of a polyolefin selected from the group consisting of high density polyethylene, low density polyethylene, linear low density polyethylene and polypropylene.

6. An adhesive tape as set forth in claim 1 wherein both the warp and the filling of the fabric base are formed of flat yarns.

7. An adhesive tape as set forth in claim 1 wherein the second thermoplastic layer is laminated on the first thermoplastic layer and the pressure-sensitive adhesive is applied to the non-laminated surface of the fabric base.

8. An adhesive tape as set forth in claim 1 wherein the second thermoplastic layer is laminated on the other surface of the fabric base and the pressure-sensitive adhesive is applied to at least one of the first thermoplastic layer surface and the second thermoplastic layer surface.

9. An adhesive tape as set forth in claim 1 wherein both the first thermoplastic layer and the second thermoplastic layer are made of polyolefin.

10. An adhesive tape as set forth in claim 9 wherein the polyolefin is selected from the group consisting of high density polyethylene, low density polyethylene, linear low density polyethylene and polypropylene.

11. An adhesive tape as set forth in claim 1 wherein the adhesive tape is transparent.

* * * * *